United States Patent
Stoof et al.

(10) Patent No.: US 9,809,077 B2
(45) Date of Patent: Nov. 7, 2017

(54) METHOD AND APPARATUS FOR OPERATING A CUSHIONING SYSTEM FOR A MOTOR VEHICLE

(71) Applicant: VOLKSWAGEN AG, Wolfsburg (DE)

(72) Inventors: Denis Stoof, Peine-Stederdorf (DE); Eckhard Babbel, Braunschweig (DE); Ulrich Sonnak, Braunschweig (DE); Matthias Klöpping, Braunschweig (DE)

(73) Assignee: Volkswagen AG (DE)

( * ) Notice: Subject to any disclaimer, the term of this patent is extended or adjusted under 35 U.S.C. 154(b) by 147 days.

(21) Appl. No.: 14/471,990

(22) Filed: Aug. 28, 2014

(65) Prior Publication Data

US 2015/0073658 A1  Mar. 12, 2015

(30) Foreign Application Priority Data

Sep. 6, 2013  (DE) ................. 10 2013 217 870

(51) Int. Cl.
  *B60G 17/016*  (2006.01)
  *B60G 17/00*   (2006.01)
  *B60G 17/06*   (2006.01)

(52) U.S. Cl.
  CPC ........ *B60G 17/016* (2013.01); *B60G 17/00* (2013.01); *B60G 17/06* (2013.01); *B60G 2400/96* (2013.01); *B60G 2500/10* (2013.01)

(58) Field of Classification Search
  CPC ...... B60G 17/00; B60G 17/016; B60G 17/06; B60G 2400/96; B60G 2500/10
  See application file for complete search history.

(56) References Cited

U.S. PATENT DOCUMENTS

| | | | | |
|---|---|---|---|---|
| 6,219,602 B1* | 4/2001 | Badenoch | ........... | B60G 17/016 180/41 |
| 7,162,346 B2* | 1/2007 | Berry | ................. | B60W 10/06 701/1 |
| 7,349,776 B2* | 3/2008 | Spillane | ............ | B60G 17/0195 701/36 |

(Continued)

FOREIGN PATENT DOCUMENTS

| | | |
|---|---|---|
| DE | 19922745 A1 | 12/2000 |
| DE | 10155646 A1 | 5/2003 |

(Continued)

OTHER PUBLICATIONS

Search Report for German Patent Application No. 10 2013 217 870.0; dated May 14, 2014.

*Primary Examiner* — Thomas G Black
*Assistant Examiner* — Peter D Nolan
(74) *Attorney, Agent, or Firm* — Barnes & Thornburg LLP

(57) ABSTRACT

A method for operating a shock-absorber system with shock-absorber devices, in particular switching shock-absorber devices, wherein discretely selectable shock-absorber characteristic curves are provided. The method determines a driving behavior of the driver and/or of the motor vehicle on the basis of one or more driving state data items and/or one or more operating variables and, in automatic mode, automatically sets a shock-absorbing behavior of the shock-absorber system by selecting one of the selectable shock-absorber characteristic curves of the shock-absorber devices as a function of the determined driving behavior.

13 Claims, 2 Drawing Sheets

(56) References Cited

U.S. PATENT DOCUMENTS

| | | | | |
|---|---|---|---|---|
| 7,672,766 B2* | 3/2010 | Poilbout | ........... | B60G 3/04 |
| | | | | 701/37 |
| 8,954,232 B2* | 2/2015 | Takeuchi | ........... | B60W 10/06 |
| | | | | 701/37 |
| 2007/0021885 A1* | 1/2007 | Soehren | ........... | B60R 16/037 |
| | | | | 701/36 |
| 2009/0099727 A1* | 4/2009 | Ghoneim | ........... | B60W 40/08 |
| | | | | 701/36 |
| 2010/0332706 A1* | 12/2010 | Hering | ........... | H03M 13/09 |
| | | | | 710/106 |
| 2012/0136506 A1* | 5/2012 | Takeuchi | ........... | B60G 17/016 |
| | | | | 701/1 |
| 2013/0151074 A1* | 6/2013 | Takeuchi | ........... | B60W 10/06 |
| | | | | 701/37 |
| 2014/0195112 A1* | 7/2014 | Lu | ........... | B60G 17/015 |
| | | | | 701/37 |
| 2015/0057883 A1* | 2/2015 | Kelly | ........... | G05B 19/042 |
| | | | | 701/36 |

FOREIGN PATENT DOCUMENTS

| | | | | |
|---|---|---|---|---|
| DE | 10360666 A1 | 7/2005 | | |
| DE | 102007051226 A1 | 4/2009 | | |
| WO | WO 2013120546 A1 * | 8/2013 | ........... | G05B 19/042 |

* cited by examiner

METHOD AND APPARATUS FOR OPERATING A CUSHIONING SYSTEM FOR A MOTOR VEHICLE

PRIORITY CLAIM

This patent application claims priority to German Patent Application No. 10 2013 217 870.0, filed 6 Sep. 2013, the disclosure of which is incorporated herein by reference in its entirety.

SUMMARY

Disclosed embodiments relate to shock-absorber systems for motor vehicles, in particular shock-absorber systems with shock-absorber devices for wheel suspension systems for motor vehicles which have fixedly predefined, selectable shock-absorber characteristic curves.

Disclosed embodiments provide a method for operating a shock-absorber system with which an improved selection of a shock-absorbing behavior of the shock-absorber system which is optimum for the driver is possible, in particular if shock-absorber devices with defined, selectable shock-absorber characteristic curves are used.

BRIEF DESCRIPTION OF THE DRAWINGS

Exemplary embodiments are explained in more detail below with reference to the appended drawings, in which.

DETAILED DESCRIPTION OF THE DISCLOSED EMBODIMENTS

Figure 1:
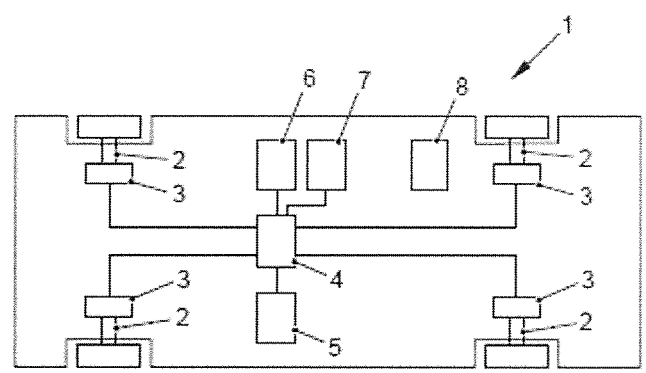
FIG. 1 shows a schematic view of a motor vehicle having a shock-absorber system.

Disclosed embodiments provide a method for operating a shock-absorber system with shock-absorber devices, in particular switching shock-absorber devices is provided, wherein discretely selectable shock-absorber characteristic curves are provided. The method comprises determining a driving behavior of the driver and/or of the motor vehicle on the basis of one or more driving state data items and/or one or more operating variables; and, in automatic mode, automatically setting a shock-absorbing behavior of the shock-absorber system by selecting one of the selectable shock-absorber characteristic curves of the shock-absorber devices as a function of the determined driving behavior.

One idea of the method disclosed hereinabove is to assist the driver in selecting a shock-absorbing behavior of the shock-absorber system in that a shock-absorbing behavior is selected automatically. The automatic selection is made on the basis of one or more driving states and/or vehicle states, wherein corresponding driving state data items and operating variables can be detected by means of a suitable sensor system or made available by a vehicle bus and, if appropriate, can be obtained by evaluation. The driving states and/or vehicle states make it possible to detect or to detect, by evaluating a driving style of the driver, which shock-absorbing behavior the driver wishes, for example a more comfortable (soft shock absorption) or more sporty (hard shock absorption) shock-absorbing behavior. In this way, the driver can be relieved of the need to make the manual selection of the suitable shock-absorbing behavior of the shock-absorber system in that the corresponding shock-absorbing behavior of the shock-absorber system is selected automatically.

Furthermore, the automatic mode and one or more manually selectable shock-absorbing modes are made available for selection using an operator control unit, wherein each of the manually selectable shock-absorbing modes is assigned a defined shock-absorbing behavior with specific, discretely selectable shock-absorber characteristic curves of the shock-absorber devices.

It can be provided, in particular, that in the automatic mode the shock-absorbing behavior can be set automatically as a function of the determined driving behavior, as a shock-absorbing behavior of one of the manually selectable shock-absorbing modes.

Furthermore, the shock-absorbing behaviors which can be set in the automatic mode correspond to the shock-absorbing behaviors which are determined by the manually selectable shock-absorbing modes.

According to at least one disclosed embodiment, in the automatic mode the shock-absorbing behavior of the shock-absorber system is set by the respective selection of one of the discretely selectable shock-absorber characteristic curves of all the shock-absorber devices as a function of the determined driving behavior. As a result, the shock-absorber characteristic curves can be selected individually for each of the shock-absorber devices.

Furthermore, the driving behavior of the driver and/or of the motor vehicle can be determined on the basis of one or more of the following driving state data items and/or one or more of the following operating variables or profiles of the corresponding operating variables:

a braking behavior of the driver or of the motor vehicle which is determined by at least one of the following operating variables: a brake pressure, a brake pressure rate of increase, a profile of the brake pressure and a profile of the brake pressure rate of increase;

a cornering behavior of the driver or of the motor vehicle which is determined by at least one of the following operating variables: a steering angle, a change in the steering angle, a jolt in the steering angle, a lateral acceleration, a yaw rate and presence of an ESP/ABS intervention; and an acceleration driving behavior of the driver or of the motor vehicle which is determined by at least one of the following operating variables and/or driving state data items: a switching frequency of a manual transmission, a measure of the use of a rotational speed range of the drive engine, a data item relating to a selection of a sporty setting in an automatic transmission, an accelerator pedal position, a vehicle speed, a vehicle acceleration, a driver's requested torque which is predefined by a driver, as well as gradients and profiles of the accelerator pedal position, the vehicle speed, the vehicle acceleration and the driver's requested torque which is predefined by a driver.

Furthermore, the driving behavior of the driver and/or of the motor vehicle is determined by at least one of the following driving state data items of a driver assistance system: a requested deceleration which is set for an automatic cruise controller, a blind spot detection, a driving profile selection, a seat occupation state, an engaged state of the trailer coupling, a characterizing data item relating to music selected by the driver and data items relating to a distance lying ahead.

Alternatively, or additionally, when a decision is made to change the shock-absorbing behavior in the automatic mode as a function of the driving behavior of the driver and/or of the motor vehicle the change in the shock-absorbing behavior is carried out only in a chronologically limited fashion, and the original shock-absorbing behavior is assumed again after expiry of a predetermined time period. In particular, the predetermined time period can depend on the driving behavior.

According to a further disclosed embodiment, a device, in particular shock-absorption control unit, is provided for operating a shock-absorber system with shock-absorber devices, in particular switching shock-absorber devices, which have discretely selectable shock-absorber characteristic curves. The device is designed to determine a driving behavior of the driver and/or of the motor vehicle on the basis of one or more driving state data items and/or one or more operating variables; and to set, in an automatic mode, a shock-absorbing behavior of the shock-absorber system by selecting one of the discretely selectable shock-absorber characteristic curves of the shock-absorber devices as a function of the determined driving behavior.

According to a further disclosed embodiment, a shock-absorber system is provided comprising one or more shock-absorber devices, in particular switching shock-absorber devices, each with a plurality of discretely selectable shock-absorber characteristic curves; and the above shock-absorption control unit.

Furthermore, an operator control unit can be provided for making available the automatic mode and at least one manually selectable shock-absorbing mode for selection.

The operator control unit can also be designed to display information about the selection of the automatic mode or of the at least one shock-absorbing mode.

According to a least one disclosed embodiment, the operator control unit can display information about the selected shock-absorbing mode in the automatic mode.

According to a further disclosed embodiment, a motor vehicle having the above shock-absorber system and having a vehicle bus and/or having one or more sensors for making available one or more operating variables and/or one or more driving state data items is provided to determine the driving behavior of the driver and/or of the motor vehicle.

FIG. 1 shows a schematic illustration of a motor vehicle 1 having a shock-absorber system. The shock-absorber system comprises, on each wheel suspension system 2, a shock-absorber device 3 in the form of a shock-absorber. The shock-absorber devices 3 serve as vibration dampers between a driven wheel and the vehicle body work and are generally of hydraulic design. Hydraulic shock-absorbers can comprise a piston which is located on a piston rod and which is guided axially in an oil-filled cylinder. When the piston rod is moved in the cylinder, oil is moved, wherein the shock absorption is brought about by the flow resistance of the oil.

The shock-absorber devices 3 are provided as switching shock-absorber devices which correspond to shock-absorber devices with predefined selectable shock-absorber characteristic curves (shock-absorber identifiers). In alternative embodiments, the shock-absorber devices 3 can also be embodied as shock-absorber devices 3 with variably adjustable shock-absorber characteristic curves, wherein these shock-absorber devices 3 are designed either to set discretely selectable shock-absorber characteristic curves by selection or are provided in the corresponding way with a ballast device which is suitable for that purpose (and which can also be integrated in a provided shock-absorption control unit) for the selection of discrete shock-absorber characteristic curves.

The shock-absorber characteristic curve characterizes the shock-absorber device 3 and corresponds to a known profile of a shock-absorbing force plotted against a speed of a movement of the piston rod in the cylinder. In the case of switching shock-absorber devices 3, a plurality of possible (discrete) shock-absorber characteristic curves can be set in a switchable fashion, but a fully variable setting of the shock-absorber characteristic curve is not possible.

An operator control unit 5 is provided which may be arranged in the cockpit in the passenger compartment of the motor vehicle 1 and permits the driver to set or select a shock-absorbing behavior of the shock-absorber system. Possible shock-absorbing behaviors may comprise, for example, a sporty mode or a comfort mode. In the case of the sporty mode, the shock-absorber devices 3 are usually provided with hard shock absorption (relatively strong shock absorption) while in the case of the comfort mode the shock absorption of the shock-absorber devices 3 is generally given a weaker setting (less strong shock absorption). The number of shock-absorbing behaviors which can be selected by means of the operator control unit 5 is however not limited to two and further additionally defined shock-absorbing modes with correspondingly assigned shock-absorbing behaviors can be provided. The operator control unit 5 permits the respective shock-absorbing mode, for example the sporty mode or the comfort mode, to be selected manually by means of a switching setting. Furthermore, the operator control unit 5 can have one or more switching settings which provide automatic selection of the shock-absorbing behavior in one or more automatic modes.

The shock-absorber devices 3 can be actuated together or individually by means of a shock-absorption control unit 4. The operator control unit 5 is connected to the shock-absorption control unit 4, with the result that the shock-absorption control unit 4 actuates the individual shock-absorber devices 3 with corresponding shock-absorber characteristic curves as a function of a switching position of the operator control unit 5. For this purpose, the shock-absorption control unit 4 can assign corresponding shock-absorber characteristic curves to the shock-absorber devices 3 to the selected shock-absorbing mode, and actuate the shock-absorber devices 3 correspondingly.

The operator control unit 5 can also provide that in the automatic mode the automatically selected shock-absorbing mode is displayed, for example by a display of "sport" for the manually or automatically selected sporty mode or "comfort" for the manually or automatically selected comfort mode, with the result that the driver is informed about the instantaneous settings of the shock-absorber system.

Figure 2:
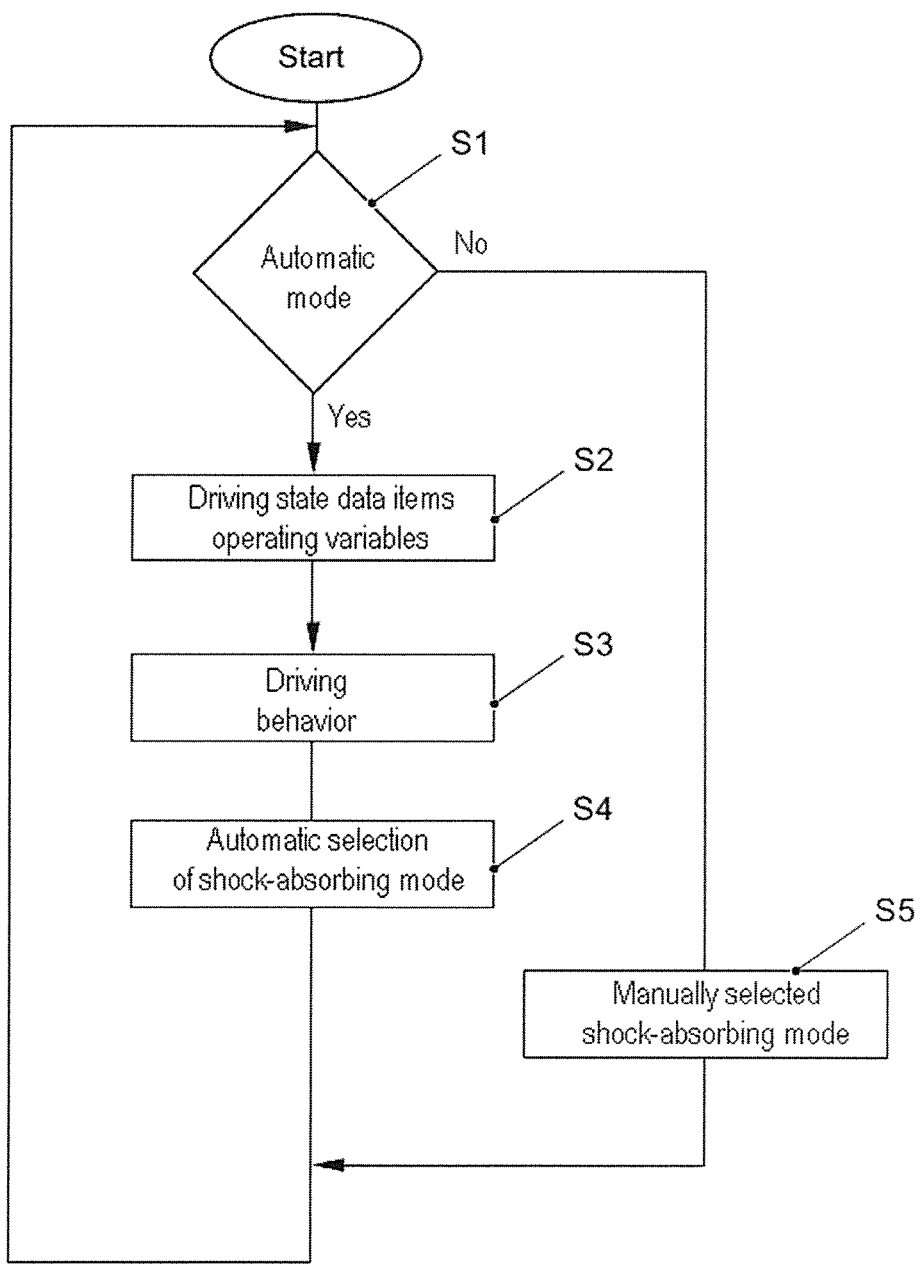
FIG. 2 shows a flow chart outlining a method for operating a shock-absorber system.

A method for operating a shock-absorber system is explained by way of example in conjunction with the flow chart in FIG. 2.

In step S1 it is checked whether the automatic mode is selected at the operator control unit 5. If the automatic mode is selected (alternative: yes) at the operator control unit 5, the shock-absorption control unit 4 is as a result instructed to continue the method with step S2 to determine one or more driving states and/or vehicle states on the basis of one or more provided operating variables and/or one or more vehicle state data items, and to make a selection of a respective shock-absorbing behavior automatically.

If the automatic mode is not selected at the operator control unit 5 (alternative: no), the shock-absorption control unit 4 is as a result instructed to set a shock-absorbing mode in accordance with the selection of the operator control unit 5 according to step S5.

In step S2, for this purpose one or more operating variables and/or one or more driving state data items are determined, and in step S3 a driving behavior is determined therefrom in accordance with a rule system or algorithm predefined in the shock-absorption control unit.

Operating variables and driving state data items as data items for the evaluation and determination of driving states and/or vehicle states can be made available to the shock-absorption control unit 4, for example, via a vehicle bus 6, which can correspond, for example, to a CAN bus, or by other control units. Alternatively or additionally, the shock-absorption control unit 4 can be connected to one or more further sensors 7 to detect operating variables which are not made available via the vehicle bus 6 and derive the driving state and/or the vehicle state therefrom. The driving state and/or vehicle state can be determined on the basis of one or more of the following driving state data items and/or one or more of the following operating variables or profiles of the corresponding operating variables according to a rule system predefined in the shock-absorption control unit 4:

A data item relating to a braking behavior of the driver or of the motor vehicle 1. The data item relating to the braking behavior can be determined by a brake pressure and/or a brake pressure rate of increase and/or a profile of the brake pressure and/or of the brake pressure rate of increase. On the basis of the braking behavior, the driving style of the driver can be detected, wherein more frequent braking with relatively high brake pressures, i.e. a braking activity above a predefined braking activity threshold value, can be considered to be a more sporty driving style (as driving behavior), which can be used for the automatic selection of the sporty mode for the shock-absorber system. In contrast, less frequent braking with relatively low brake pressures, i.e. a braking activity below a predefined braking activity threshold value corresponds more to a more comfortable driving style (as driving behavior), which can be used for the automatic selection of the comfort mode for the shock-absorber system.

A data item relating to a cornering behavior of the driver or of the motor vehicle 1. The data item relating to the cornering behavior is decisively determined by the distance to be traveled. However, the driving style of the motor vehicle 1 or of the driver can additionally be determined by the one or more operating variables comprising the steering angle, change in the steering angle, jolt in the steering angle, lateral acceleration, yaw rate and presence of an ESP/ABS intervention. These operating variables can specify, for example, the degree of curvature of a distance selected by the driver and traveled along. For example, in the case of a relatively high degree of curvature (as driving behavior), i.e. a degree of curvature above a predefined curvature threshold value, a shock-absorbing mode with a relatively high shock-absorber characteristic curve (harder shock absorption=sporty mode) can be selected automatically for stability reasons, and in the case of a relatively small degree of curvature (as driving behavior), i.e. a degree of curvature below a predefined curvature threshold value, a shock-absorbing mode with a lower shock-absorber characteristic curve (less strong shock absorption=comfort mode) can tend to be selected for comfort reasons.

A data item relating to an acceleration driving behavior of the driver or of the motor vehicle 1. The data item relating to the acceleration driving behavior can be determined by one or more of the data items comprising the switching frequency, use of the rotational speed range, selection of a sporty setting in the case of an automatic transmission, accelerator pedal position as well as by means of the operating variables comprising the vehicle speed, vehicle acceleration, driver's requested torque (for example predefined by an accelerator pedal position) and gradients and profiles of these operating variables. The speed cycles and acceleration cycles of the motor vehicle 1 can be evaluated by means of these driving state data items and these operating variables. In this context, for example above-average (relatively high) acceleration and/or an above average frequency of the occurrence of acceleration, i.e. an acceleration rate which is dependent on the acceleration and/or frequency thereof above a predefined acceleration rate threshold value indicate a sporty driving style of the driver (as driving behavior) which can be used for the automatic selection of the sporty mode for the shock-absorber system. Conversely, below-average (low) acceleration and/or a below-average frequency of occurrence of acceleration, i.e. an acceleration rate below a predefined acceleration rate threshold value indicate a comfortable driving style of the driver (as driving behavior), which can be used for the automatic selection of the comfort mode for the shock-absorber system.

Acceleration sensors for various vehicle axles can be provided as additional sensors 7 to detect vehicle movements and the changes thereof directly and to determine the braking behavior, the cornering behavior and/or the acceleration driving behavior directly. In addition, wheel travel sensors can also be provided as sensors 7, with which corresponding operating variables such as, for example, the vehicle speed, the vehicle acceleration and cornering, can also be detected to derive the braking behavior, cornering behavior and/or acceleration driving behavior therefrom.

The driving state data items and operating variables specified above can be evaluated in the shock-absorption control unit 4 in step S4 by means of suitable predefined algorithms and converted into a decision as to which shock-absorbing mode (for example the sporty mode or the comfort mode) is to be selected automatically. In particular, the data items relating to the driving behavior which are determined from the evaluations relating to the cornering behavior, braking behavior and acceleration driving behavior, can be combined with one another to obtain a driving behavior as a basis for an automatic selection in the automatic mode.

Subsequently, the system jumps back to step S1 to carry out cyclically the method sequence described previously.

Depending on the driving behavior of the driver and/or of the motor vehicle 1, both brief switching over operations between the comfort mode and the sporty mode are possible as well as, such as for example in the wheel frequency range or when end stops are reached, relatively long-term switching operations, for example switching over from a comfort mode into the sporty mode when the driver activates the steering wheel and exceeds a specific steering angle speed, wherein the sporty mode is maintained for a predetermined time period which is dependent on the triggering driving behavior, such as for example several seconds, before the system changes back automatically again into the comfort mode.

It can generally be provided that in the case of a decision to change the shock-absorbing behavior in the automatic mode the change is carried out only in a chronologically limited fashion, in particular as a function of the driving behavior of the driver and/or of the motor vehicle 1, and the switching over is canceled again after the expiry of a predetermined time period. The switching back into the original shock-absorbing mode can occur in the case of one driving behavior or a plurality of defined driving behaviors, in particular as a function of any change in the driving behavior of the driver and/or of the motor vehicle 1.

Furthermore, specific settings or information of a driver assistance system 8, such as for example the requested deceleration which is set for an automatic cruise controller, a blind spot detection, a driving profile selection, seat occupation state and an engaged state of the trailer coupling, can also be used as driving state data items which characterize the driving behavior. Furthermore, the music which is selected by the driver can also be used as a data item which characterizes the driving behavior in terms of the music genre and the volume of the music. Furthermore, data items from the navigation system, such as for example the location, road profile and state of the road as well as the condition (curviness, type of route etc.) of the route lying ahead can be used as driving state data items about a driving behavior of the driver or of the motor vehicle 1 and are made available to the shock-absorption control unit 4 for evaluation.

In particular it is possible to provide in the automatic mode that the shock-absorber devices 3 are set individually (based on wheel suspension systems 2) in different ways. In particular, when cornering or frequent cornering is detected by evaluating the cornering behavior the shock absorption of the shock-absorber device 3 is set differently on the left-hand and right-hand side of the vehicle, respectively. In particular, in the case of a left-hand bend the shock-absorber devices 3 on the right-side of the vehicle can be set to a shock-absorber characteristic curve with hard shock absorption, and those on the left-hand side of the vehicle can be set to a shock-absorber characteristic curve with soft shock absorption and vice versa.

Furthermore, the agility of the motor vehicle 1 can be set by different settings of the shock-absorber characteristic curves of the shock-absorber devices 3 at the front wheels and at the rear wheels. For example, a high level of agility is obtained by means of a shock-absorber characteristic curve for soft shock absorption of the front wheel suspension systems 2, and a shock-absorber characteristic curve for hard shock absorption at the rear shock-absorber devices 3. Furthermore, in the automatic mode the shock-absorber characteristic curves of individual shock-absorber devices 3 can be adapted correspondingly when wheel-specific states, such as for example wheel travel, wheel acceleration or vehicle body acceleration, are detected.

In the preceding exemplary embodiment, the operator control unit 5 permits the selection to be made between the sporty mode, comfort mode and automatic mode. Alternatively, it is possible to provide here just one manually selectable shock absorbing mode, for example either the sporty mode or the comfort mode, which can be selected in addition to the automatic mode by the operator control unit 5.

Instead of the direct connection of the operator control unit 5 to the shock-absorption control unit 4, the corresponding selection which is made at the operator control unit can also be transmitted to the shock-absorption control unit 4 via the vehicle bus 6. In particular, the operator control unit 5 can be part of an operator control element of a further vehicle device, the control unit of which operator control element informs the shock-absorption control unit 4 about the selection at the operator control unit 5.

In a further disclosed embodiment, it is possible to dispense with the operator control unit 5, and the motor vehicle 1 is operated only in the automatic mode, i.e. with automatic selection of the shock-absorbing behavior, such as for example the comfort mode or the sporty mode for the shock-absorber system 1.

Various types of shock-absorber systems are known for absorbing shocks in motor vehicles. For example, fully variable shock-absorber devices can therefore be provided on the wheel suspension systems which have continuously adjustable shock-absorber characteristic curves. Open-loop or closed-loop control of the shock-absorbing behavior of such fully variable shock-absorber devices is generally performed as a function of the driving states or vehicle states and makes particularly stringent requirements of the configuration of the shock-absorber system.

For example, document DE 101 55 646 A1 discloses a method for controlling settable shock-absorbers of a wheel suspension system of a motor vehicle in which a shock-absorption hardness is set in a variable fashion as a function of a vehicle state for each individual shock absorber.

In addition, shock-absorber systems with switching shock-absorber devices, which have shock-absorber devices with defined shock-absorber characteristic curves, are known. Such shock-absorber characteristic curves are selected in such a way that depending on a selection by a driver a specific predefined shock-absorbing behavior can be set, which permits a comfortable driving style or sporty driving style.

For example, document DE 10 2007 051226 A1 discloses a shock-absorber system with switching shock-absorber devices in which a driver can make a manual selection between a plurality of shock-absorbing modes such as, for example, "normal", "comfort" and "support" using an operator control device, in this way to adapt the shock-absorber system to his requirements. One of the provided shock-absorber characteristic curves of the shock-absorber devices is set at the wheel suspension systems in accordance with the selection by the driver.

Furthermore, shock-absorber systems are known in which a driver can select between various closed-loop control programs which can be used either with fully variable shock-absorber devices or with shock-absorber devices with defined shock-absorber characteristic curves.

LIST OF REFERENCE NUMERALS

1 Motor vehicle
2 Wheel suspension system
3 Shock-absorber device
4 Shock-absorption control unit
5 Operator control unit
6 Vehicle bus
7 Sensor system
8 Driver assistance system

The invention claimed is:

1. A method for operating a shock-absorber system with switching shock-absorber devices, wherein discretely selectable shock-absorber characteristic curves are provided, the method comprising:
   determining a driving behavior of the driver and/or of the motor vehicle based on one or more driving state data items and/or one or more operating variables;
   in automatic mode, automatically setting a shock-absorbing behavior of the shock-absorber system by selecting one of the selectable shock-absorber characteristic curves of the shock-absorber devices as a function of the determined driving behavior;
   wherein the driving behavior of the driver and/or of the motor vehicle is determined based on at least one of the following data items of a driver assistance system: a requested deceleration which is set for an automatic cruise controller, a blind spot detection, a seat occupation state, an engaged state of the trailer coupling, a characterizing data item relating to music selected by the driver and data items relating to a distance lying ahead, and wherein in response to a decision being made to change the shock-absorbing behavior in the automatic mode as a function of the driving behavior of the driver and/or of the motor vehicle, the change in the shock-absorbing behavior is carried out only in a chronologically limited fashion, and the original shock-absorbing behavior is assumed again after expiry of a predetermined time period.

2. The method of claim 1, wherein the automatic mode and one or more manually selectable shock-absorbing modes are made available for manual selection using an operator control unit, wherein each of the manually selectable shock-absorbing modes is assigned a defined shock-absorbing behavior with specific, discretely selectable shock-absorber characteristic curves of the shock-absorber devices.

3. The method of claim 2, wherein, in the automatic mode, the shock-absorbing behavior is set automatically as a function of the determined driving behavior, as a shock-absorbing behavior of one of the manually selectable shock-absorbing modes.

4. The method of claim 3, wherein the shock-absorbing behaviors which are adjusted in the automatic mode correspond to the shock-absorbing behaviors which are determined by the manually selectable shock-absorbing modes.

5. The method of claim 1, wherein, in the automatic mode, the shock-absorbing behavior of the shock-absorber system is set by the respective selection of one of the discretely selectable shock-absorber characteristic curves of all the shock-absorber devices as a function of the determined driving behavior.

6. The method of claim 1, wherein the driving behavior of the driver and/or of the motor vehicle is further determined based on one or more of the following driving state data items and/or one or more operating variables or profiles of the corresponding operating variables:

a braking behavior of the driver or of the motor vehicle, which is determined by at least one of the following operating variables: a brake pressure, a brake pressure rate of increase, a profile of the brake pressure and a profile of the brake pressure rate of increase;

a cornering behavior of the driver or of the motor vehicle, which is determined by at least one of the following operating variables: a steering angle, a change in the steering angle, a jolt in the steering angle, a lateral acceleration, a yaw rate and presence of an ESP/ABS intervention; and an acceleration driving behavior of the driver or of the motor vehicle, which is determined based on at least one of the following operating variables and/or at least one of the following driving state data items: a switching frequency of a manual transmission, a measure of the use of a rotational speed range of the drive engine, a data item relating to a selection of a sporty setting in an automatic transmission, an accelerator pedal position, a vehicle speed, a vehicle acceleration, a driver's requested torque which is predefined by a driver, as well as gradients and profiles of the accelerator pedal position, the vehicle speed, the vehicle acceleration and the driver's requested torque which is predefined by a driver.

7. The method of claim 1, wherein the predetermined time period depends on the driving behavior.

8. A shock-absorption control unit that operates a shock-absorber system with switching shock-absorber devices, which have discretely selectable shock-absorber characteristic curves, wherein the shock-absorption control unit:

determines a driving behavior of the driver and/or of the motor vehicle based on one or more driving state data items and/or one or more operating variables;

sets, in an automatic mode, a shock-absorbing behavior of the shock-absorber system by selecting one of the selectable shock-absorber characteristic curves of the switching shock-absorber devices as a function of the determined driving behavior;

wherein the control unit sets shock absorbers on a left vehicle side to a first characteristic curve and shock absorbers on a right vehicle side to a different characteristic curve based on cornering behavior; and wherein the selected shock-absorbing behavior of the shock absorber-system is cancelled and switches back to an original shock-absorbing mode after the expiry of a predetermined time period.

9. A shock-absorber system, comprising:

one or more shock-absorber devices each with a plurality of discretely selectable shock-absorber characteristic curves; and a shock-absorption control unit, for operating a shock-absorber system with switching shock-absorber devices, which have discretely selectable shock-absorber characteristic curves, wherein the shock-absorption control unit determines a driving behavior of the driver and/or of the motor vehicle based on one or more driving state data items and/or one or more operating variables; and sets, in an automatic mode, a shock-absorbing behavior of the shock-absorber system by selecting one of the selectable shock-absorber characteristic curves of the switching shock-absorber devices as a function of the determined driving behavior;

wherein the control unit sets shock absorbers on a left vehicle side to a first characteristic curve and shock absorbers on a right vehicle side to a different characteristic curve based on cornering behavior; and wherein the selected shock-absorber characteristic curves of the shock absorber-system are cancelled and the system switches back to an original shock-absorbing mode after the expiry of a predetermined time period.

10. The shock-absorber system of claim 9, wherein an operator control unit is provided for making available the automatic mode and/or at least one manually selectable shock-absorbing mode for selection.

11. The shock-absorber system of claim 10, wherein the operator control unit displays information about the selection of the automatic mode or of the at least one shock-absorbing mode.

12. The shock-absorber system of claim 9, wherein the operator control unit displays information about the selected shock-absorbing mode in the automatic mode.

13. A motor vehicle having a shock-absorber system, comprising:

one or more shock-absorber devices each with a plurality of discretely selectable shock-absorber characteristic curves; and a shock-absorption control unit that operates a shock-absorber system with switching shock-absorber devices, which have discretely selectable shock-absorber characteristic curves, wherein the shock-absorption control unit determines a driving behavior of the driver and of the motor vehicle based on one or more driving state data items and one or more operating variables; and sets, in an automatic mode, a shock-absorbing behavior of the shock-absorber system by selecting one of the selectable shock-absorber characteristic curves of the switching shock-absorber devices as a function of the determined driving behavior, and has a vehicle bus and having one or more sensors for making available one or more operating variables and one or more driving state data items to determine the driving behavior of the driver and of the motor vehicle; and wherein the set shock-absorber behavior of the shock absorber-system are cancelled and the system switches back to an original shock-absorbing mode after the expiry of a predetermined time period.

* * * * *